United States Patent [19]
Lauw et al.

[11] Patent Number: 5,559,685
[45] Date of Patent: Sep. 24, 1996

[54] VOLTAGE CLAMPED PARALLEL RESONANT CONVERTER WITH CONTROLLABLE DUTY CYCLE

[75] Inventors: Hian K. Lauw; Robert S. Zedwick, both of Corvallis, Oreg.

[73] Assignee: Electronic Power Conditioning, Inc., Corvallis, Oreg.

[21] Appl. No.: 322,100

[22] Filed: Oct. 12, 1994

[51] Int. Cl.$^6$ .................................................. H02M 5/45
[52] U.S. Cl. ........................................ 363/37; 323/222
[58] Field of Search ............................. 363/37; 323/222

[56] References Cited

U.S. PATENT DOCUMENTS

| | | | |
|---|---|---|---|
| 4,035,710 | 7/1977 | Joyce | 363/37 |
| 4,642,748 | 2/1987 | Kirk | 363/56 |
| 4,864,483 | 9/1989 | Divan | 363/37 |
| 4,935,859 | 6/1990 | Kirchberg et al. | 363/39 |
| 4,942,511 | 7/1990 | Lipo et al. | 363/136 |
| 4,965,709 | 10/1990 | Ngo | 363/37 |
| 5,021,937 | 6/1991 | Cohen | 363/41 |
| 5,038,267 | 8/1991 | DeDoncker et al. | 363/89 |
| 5,111,374 | 5/1992 | Lai et al. | 363/37 |
| 5,166,549 | 11/1992 | DeDoncker | 307/354 |
| 5,172,309 | 12/1992 | DeDoncker et al. | 363/132 |
| 5,235,501 | 8/1993 | Stuart et al. | 363/17 |
| 5,262,930 | 11/1993 | Hua et al. | 363/21 |
| 5,267,133 | 11/1993 | Motomura et al. | 363/21 |
| 5,267,138 | 11/1993 | Shores | 363/98 |
| 5,309,344 | 5/1994 | Smith | 363/20 |

OTHER PUBLICATIONS

"A Synchronized Resonant DC Link Converter for Soft-Switched PWM", by D. M. Divan, L. Malesani, P. Tenti and V. Toigo, IEEE Transactions on Industry Applications, vol. 29, No. 5, Sep./Oct. 1993, pp. 940–948.

"Power Electronics: Converters, Applications and Design", by N. Mohan, T. M. Undeland and W. P. Robbins, published by John Wiley & Sons, 1989, pp. 415–427.

*Primary Examiner*—Stuart N. Hecker
*Attorney, Agent, or Firm*—Klarquist Sparkman Campbell Leigh & Whinston, LLP

[57] ABSTRACT

A high efficiency static voltage clamped parallel resonant converter for converting power between two AC and/or DC circuits includes a link circuit between an input switch circuit and an output switch circuit. The link circuit comprises a parallel resonant circuit and link switch elements which are switched to generate a unipolar train of link voltage pulses. All of the switches are "soft-switched" on and off at substantially zero voltage or zero current. Each link voltage pulse consists of a zero segment and a non-zero segment. The duty cycle of these voltage pulses is controllable by the link switches and such that the duration of the zero and non-zero segments are independently controllable. Pulse width modulation (PWM) and pulse area modulation (PAM) can be applied for reduced filtering requirements and maintaining high efficiency for operation at fractional load conditions. The link voltage is clamped to a maximum voltage during the non-zero segment of each link voltage pulse. Resonant oscillation due to the resonant circuit is active only during the transitions between the zero and non-zero voltage levels of the link voltage pulses. As a result, all converter components will be exposed to voltage and current levels which are higher than the load voltage and current levels by just a small fraction.

20 Claims, 9 Drawing Sheets

VOLTAGE CLAMPED PARALLEL RESONANT CONVERTER WITH CONTROLLABLE DUTY CYCLE

BACKGROUND OF THE INVENTION

The invention relates to poly-phase electrical power converters suitable for application at high power levels and, in particular, to parallel resonant converters. The parallel resonant converters of the present invention employ link circuits which produce link voltage pulses having zero and non-zero segments which are independently controlled in duration by controlling the duty cycle of the link voltage pulses with electronic switches, and which limit the maximum voltage of the non-zero segments by voltage clamping devices.

The advantage of resonant converters over hard switched converters is that it is possible to apply significantly increased modulation frequencies due to the reduction of switching losses achieved by soft-switching all semiconductors of the converter. The resulting possibility to apply higher modulation frequencies translates into reduced filtering requirements and, therefore, reduced cost.

In spite of the reported successes in the technology of soft-switching at zero voltage or zero current of the link pulses for transferring power at increasingly higher power levels, it appears that the dominance of parallel resonant converters is hampered by certain major obstacles. In most parallel resonant converters for high power applications, link circuit elements between the electric power source and the load generate link voltage pulses with each pulse consisting of an idle or zero segment and a power transfer or non-zero segment. Conventional parallel resonant converters are in a state of at least a complete half-cycle resonance during the entire power transfer segment. The resulting high peak values of voltages or currents to which the components of these kind of converters are exposed, become excessive with increasing modulation frequency, defeating the cost advantage of the reduced filtering requirements as mentioned before.

The drawback of the conventional parallel resonant converters is mitigated in a kind of converter known as parallel quasi-resonant converters (PQRC) or voltage clamped parallel resonant converters. In this kind of converter use is made of the principle of power transfer through quasi-resonance. The first known patent to apply the principal of quasi-resonance to parallel resonant converters suited for high power applications is U.S. Pat. No. 4,864,483 issued Sep. 5, 1989 to Divan. Similar converters are shown in U.S. Pat. No. 5,038,267 issued Aug. 6, 1991 to DeDoncker and U.S. Pat. No. 5,172,309 issued Dec. 15, 1992 to DeDoncker et al. Basically the link voltage pulse of a PQRC is clamped to some near-constant value during the power transfer segment and is only in a state of resonance during the rise of the link voltage pulse to the clamp voltage level and during the termination of the pulse when it falls to zero. The resultant near-square wave pulses obviously lead to a higher duty cycle than the duty cycle achieved from pulses generated by a full resonant cycle as used in conventional parallel resonant converters. Moreover, since these near-square wave pulses are similar to those generated by conventional hard-switched converters, all components of a PQRC incur voltage and current levels which are less than or comparable to those of conventional hard-switched converters. The DeDoncker patents use soft-switching which may be achieved by the zero voltage crossing detector of U.S. Pat. No. 5,166,549 issued Nov. 24, 1992 to DeDoncker.

A crucial problem to overcome with PQRC's is the lack of possibility to control in a continuous fashion the duration of the idle and power transfer segments of the pulses, i.e. continuous control of the duty cycle is not possible. For a PQRC and a conventional hard-switched PWM (pulse width modulated) converter to achieve the same output accuracy, the modulation frequency of the PQRC would need to be a multiple of that used for the conventional hard-switched converter. The basic reason is the need for the PQRC to use integral-cycle control to shape the output waveforms, i.e. the pulses which have fixed durations of idle and power transfer segments are simply distributed over the multiple output phases or switched between positive and negative polarities. This integral-cycle control is obviously inferior to a control which can exploit the flexibility to control the duration of these segments as indeed is fundamental to well-known control strategies such as PWM and pulse area modulation (PAM) control. PWM can be applied to most kinds of hard-switched converters.

Another serious detrimental effect of the need to apply integral-cycle control is on the efficiency of the converter. The lack of controllability of the duration of the power transfer segment leads to wasting of pulses in order to extract excess energy delivered to the load due to instances when the load demands a duration of the power transfer segment to be shorter than the fixed duration for which the PQRC is designed. Moreover, to minimize the reduction of efficiency during operation at fractional load, controllability of the duration of the idle segment is essential. An attempt to allow control of the duration of the power transfer segment is presented in a paper by Divan, Malesani and Toigo: "A Synchronized Resonant DC Link Converter for Soft-Switched PWM", IEEE Trans. on Ind. Appl., published in September 1993. However, the initiation process of the link voltage pulse is conducted by means of two different high-frequency resonance circuits and as a result, the principle of power transfer through quasi-resonance is compromised. Thus, the desired controllability is achieved at the cost of the lack of voltage clamping capability. The peak value of the link voltage to which the converter components are exposed, can be expected to become excessive during large swings of the load current or as the modulation frequency is increased.

SUMMARY OF THE INVENTION

One object of the present invention is to provide a parallel resonant power converter of high efficiency having continuous controllability of the duty cycle of the link voltage pulses to independently control the duration of the zero segment and non-zero segment of such pulses.

A further object of the invention is to provide such a converter with voltage clamping for clamping the maximum voltage level of the non-zero segment.

Another object of the invention is to provide a parallel resonant converter with a link circuit having link switches for controlling the duration of the zero and non-zero segments of the link voltage pulses while maintaining the capability of soft-switching at zero voltage or zero current for all link switches of the converter.

A further object of the invention is to provide such converter with continuous controllability of the duty cycle by independent continuous control of the durations of the zero and non-zero segments of each link voltage pulse.

An additional object of this invention is to provide such resonant converter with minimal circuit elements.

Still another object of this invention is to provide such resonant converter in which each circuit component is exposed to voltage and current ratings only slightly higher than those of the load.

BRIEF DESCRIPTION OF THE DRAWINGS

Other objects and advantages of the present invention will be apparent from the following detailed description of preferred embodiments thereof and from the attached drawings of which.

DESCRIPTION OF THE PREFERRED EMBODIMENTS

Figure 1:
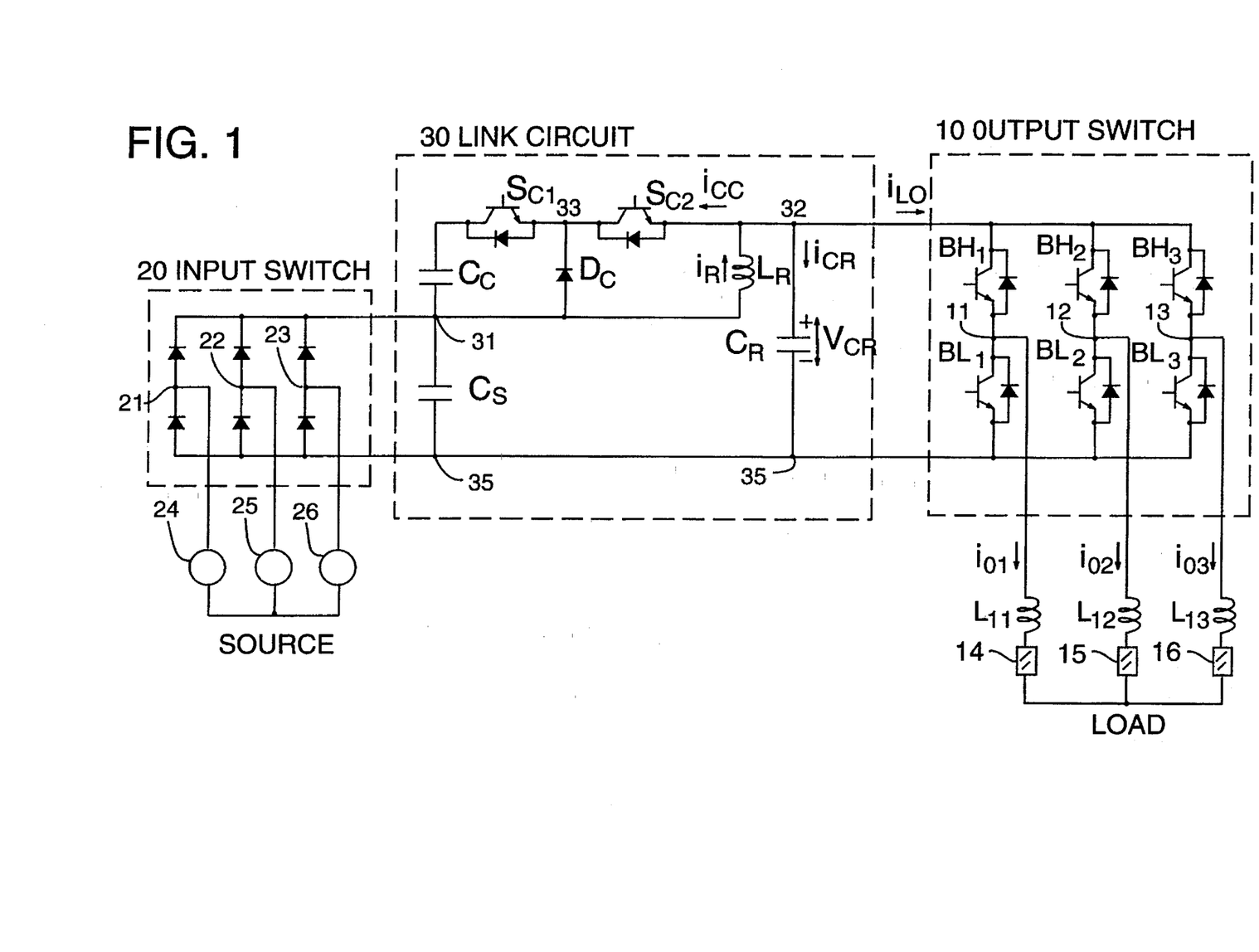
FIG. 1 is a schematic block diagram of one embodiment of the voltage clamped parallel resonant converter of the present invention for three-phase AC to AC (or DC) power transfer having a link circuit pulse generator with switches for control of the duty cycle of the link voltage pulses.

FIG. 1 illustrates a first embodiment of a voltage clamped parallel resonant converter with controllable duty cycle made in accordance with the present invention for a three-phase AC to AC power conversion. The converter can be observed to consist of three major components: the output switch circuit 10, the input switch circuit 20 and the link circuit 30. Crucial to establishing the features claimed in this invention is the link circuit which generates link voltage pulses $V_{CR}$ across the resonant capacitor.

The output switch circuit 10 includes three pairs of transistor switches BH1-BL1, BH2-BL2, and BH3-BL3 which having the emitter of the first switch BH connected to the collector of the second switch BL and have anti-parallel diodes connected between the emitter and collector of each transistor. The output switch circuit has three output terminals 11, 12 and 13 which are each connected from the common emitter to collector connection of a different one of such three pairs of transistor switches to one of three load resistances 14, 15 and 16, respectively, through inductances $L_{11}$, $L_{12}$ and $L_{13}$ which provide a three-phase AC load. The input switch circuit 20 includes three input terminals 21, 22 and 23 which are each connected from the common cathode to anode connections of different one of three pairs of diodes forming a bridge rectifier to a different one of three AC voltage sources 24, 25 and 26 which together form a three-phase AC voltage source such as electrical utility power lines.

The link circuit 30 is a parallel resonant converter with a positive voltage input terminal 31 and a negative voltage input terminal 35 connected to the rectified outputs of the input switch circuit 20. A buffer capacitor $C_S$ is connected across the input terminals 31 and 35 of the link circuit and a resonant capacitor $C_R$ is connected across the output terminals 32 and 35 of the link circuit. A link voltage pulse signal $V_{CR}$ is generated by the link circuit across the resonant capacitor and such link voltage pulses are applied to the inputs of the output switch circuit 10. The link circuit includes a resonant inductor $L_R$ connected from input terminal 31 to the upper plate of the resonant capacitor at output terminal 32. A pair of link switches $S_{C1}$ and $S_{C2}$ are connected in series from the output terminal 32 to the upper plate of a clamping capacitor $C_C$ whose lower plate is connected to input terminal 31. A clamping diode $D_C$ is connected from input terminal 31 to an intermediate terminal 33 between the link switches $S_{C1}$ and $S_{C2}$ which each include a switching transistor and an anti-parallel diode connected between the emitter and collector of such transistor. Switching signals applied to the bases of the transistors control the operation of link switches $S_{C1}$ and $S_{C2}$ to independently change the durations of the zero segment and the non-zero segment of the link voltage pulses $V_{CR}$ and thereby change the duty cycle of such pulses as hereafter discussed. The output switch circuit 10 switches BH and BL and the link switches $S_{C1}$ and $S_{C2}$ are "soft-switched" by the switching signals applied to their bases when their emitter to collector signals are at zero voltage or zero current.

The embodiments of the parallel resonant converter shown in FIGS. 2–5 are similar to that of FIG. 1 so that the same components have been marked the same way as in FIG. 1 and only the differences will be described.

Figure 7:
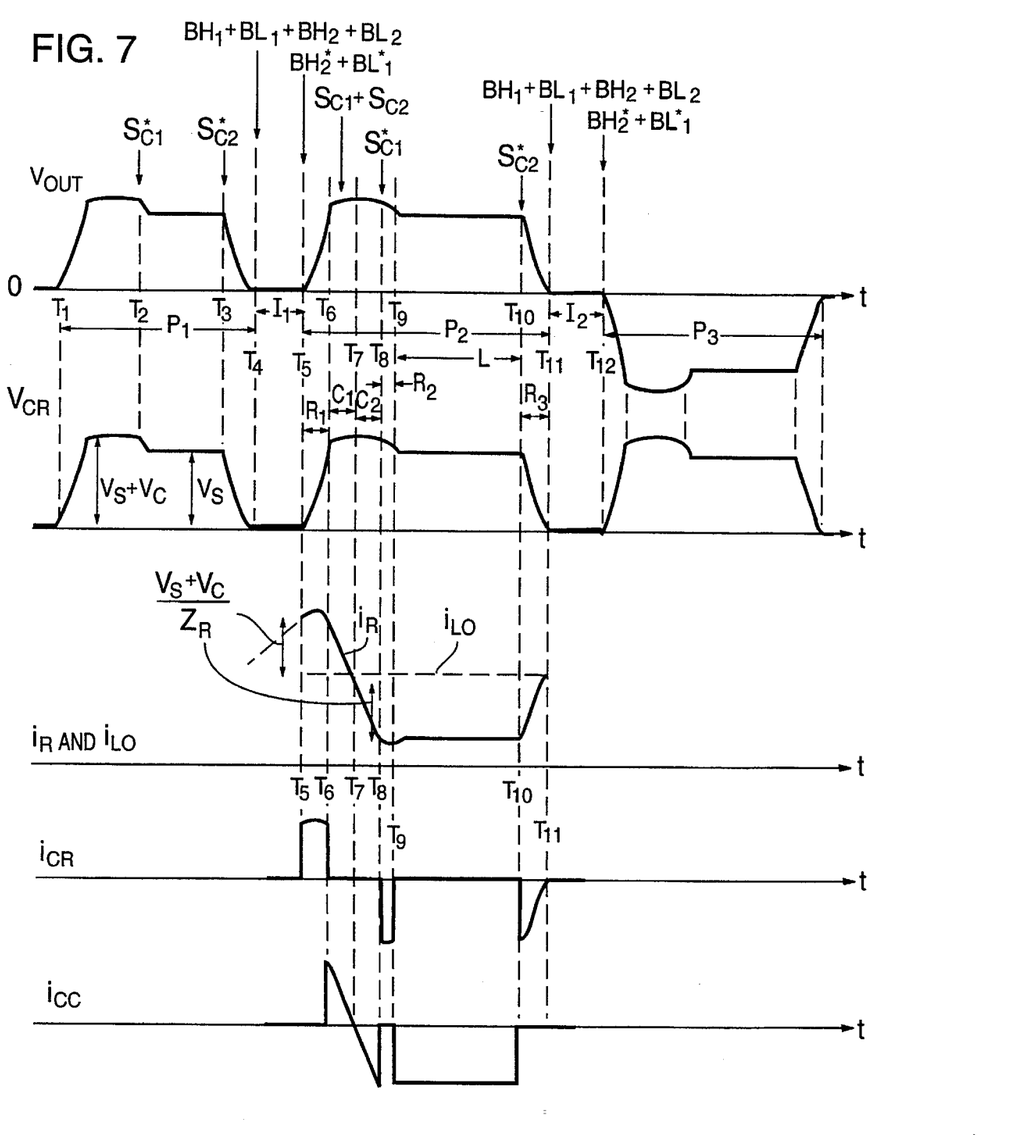
FIG. 7 shows the waveforms of signals including current signals produced during operation of the invention in the non-zero or power transfer segments of the link voltage pulses.

The link voltage pulses $V_{CR}$ each consist of an idle or zero voltage segment and a power transfer or non-zero segment voltage, as shown in FIG. 7.

Figure 2:
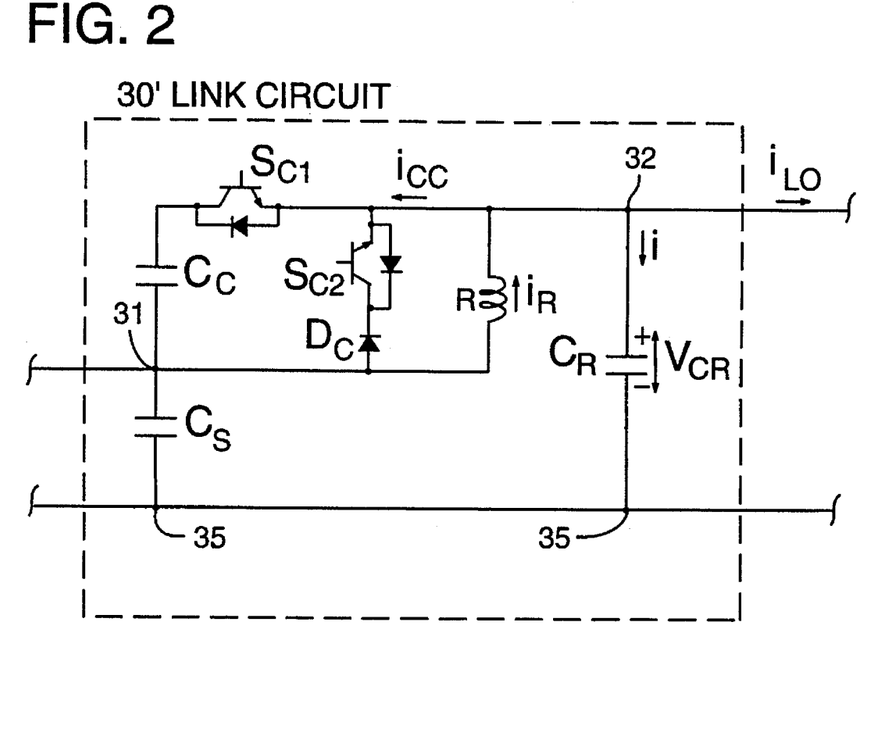
FIG. 2 is a schematic block diagram of another embodiment for the link circuit in the converter of FIG. 1.
Figure 3:
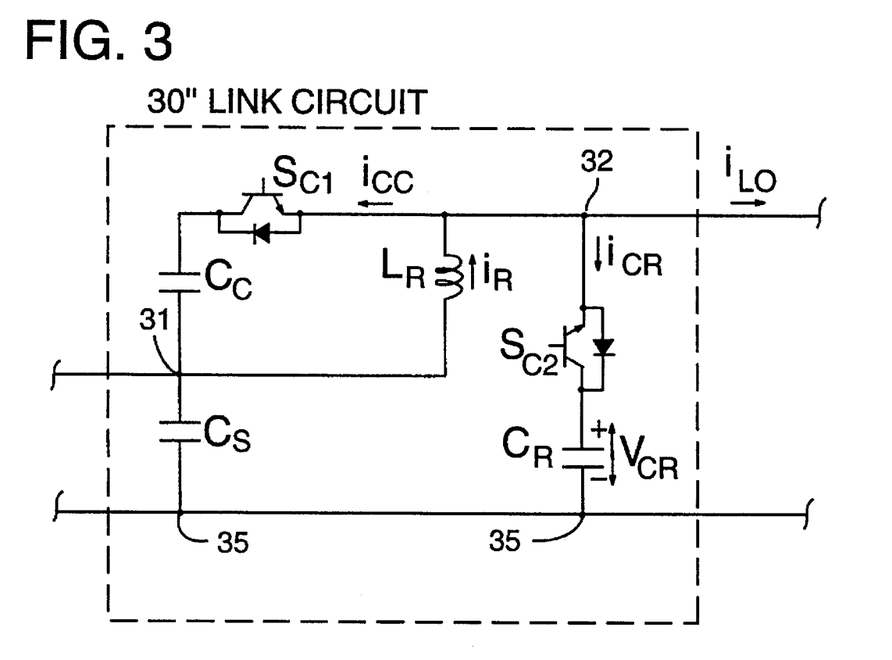
FIG. 3 is a schematic block diagram of a third embodiment for the link circuit in the converter of FIG. 1.

The link circuit 30 differs from the prior art in that the converter is provided with the combined features of (a) clamping the non-zero segment of link voltage pulses to some near-constant maximum voltage value such that it is higher than the load voltage by only a small margin, (b) controllable duty cycle of the link voltage pulses with independent controllability of the idle and power transfer segments of such pulses as well as (c) assuring soft-switching of all semiconductor switches including link switches $S_{C1}$ and $S_{C2}$, at substantially zero voltage or zero current. These features are established by the following three measures:

(1) The link circuit 30 of FIG. 1 uses switch $S_{C2}$ and the clamp diode $D_C$ to perform the function of continuous control of the link voltage pulse duty cycle with independent and continuous control of the duration of both the idle and power transfer segments of each voltage pulse. FIGS. 2 and 3 are other embodiments 30' and 30" of this link circuit 30. In FIG. 2, the same duty cycle control function is also carried out by $S_{C2}$ and $D_C$ which are connected in series between input 31 and output 32 and in parallel with the resonant inductor $L_R$. The first diode switch $S_{C1}$ is connected at its emitter directly to output 32. In the embodiment of FIG. 3 the clamping diode $D_C$ is eliminated because only $S_{C2}$ is needed to control the duty cycle of the link voltage pulses and is connected in series with the resonant capacitor $C_R$.

(2) The capacitance of the buffer capacitor $C_S$ compared to the clamp capacitor $C_C$ of FIGS. 1–3 is sufficiently high such that the voltage across $C_S$ will remain practically constant for some reasonable period of time. A sufficiently large value of $C_S$ is often already required in practice in order to provide the converter with a hold-up time of the order of milliseconds for achieving a desired ride-through capability for certain faults at the power source. Therefore, $C_S$ is usually in the order of milli-Farads for high-power applications. $C_S$ is precharged during the start-up process to some DC voltage value depending on the rating of the converter.

(3) The capacitance of the clamp capacitor $C_C$ of FIGS. 1–3 is sufficiently high such that the voltage across $C_C$ will remain practically constant for at least one cycle of the high-frequency link voltage pulses $V_{CR}$. The capacitance to be chosen for $C_C$ depends on the rating of the converter. For a 50 KW and 480V converter, $C_C$ is in the order of 100 micro-Farad. $C_C$ is referred to as a clamp capacitor because this capacitor is used to prevent the link voltage from increasing above a predetermined maximum value to excessive values. $C_C$ is precharged to some desired voltage value, again depending on the rating of the converter, as part of the start-up procedure of the converter. As hereafter discussed, the voltage across $C_C$ is controlled to remain within some margin of this precharged value.

Figure 4:
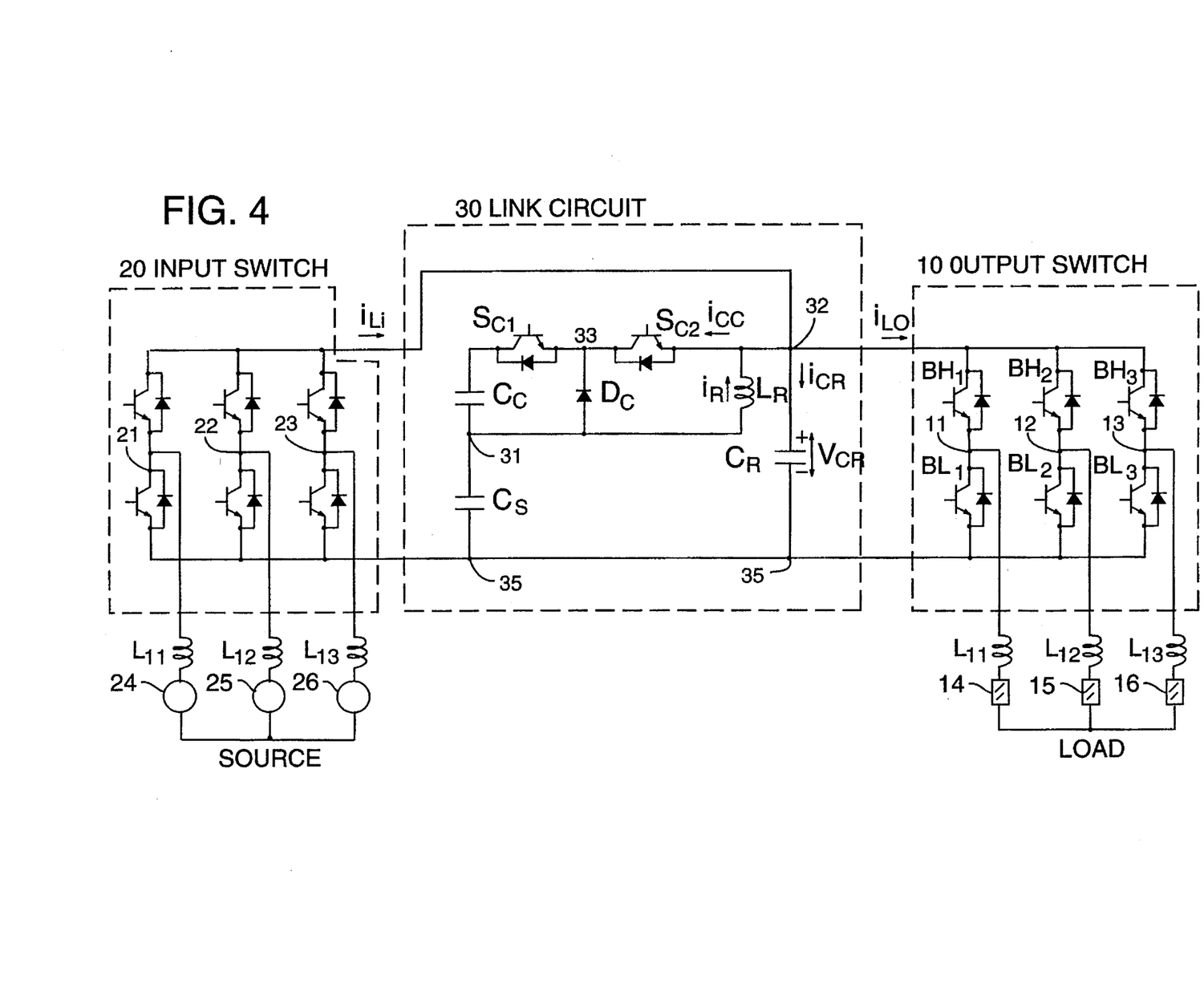
FIG. 4 is a schematic block diagram of a converter which is similar to the converter shown in FIG. 1, but in which the input switch circuit is modified to allow for bi-directional four-quadrant operation, input current wave-shaping and input power factor control.
Figure 5:
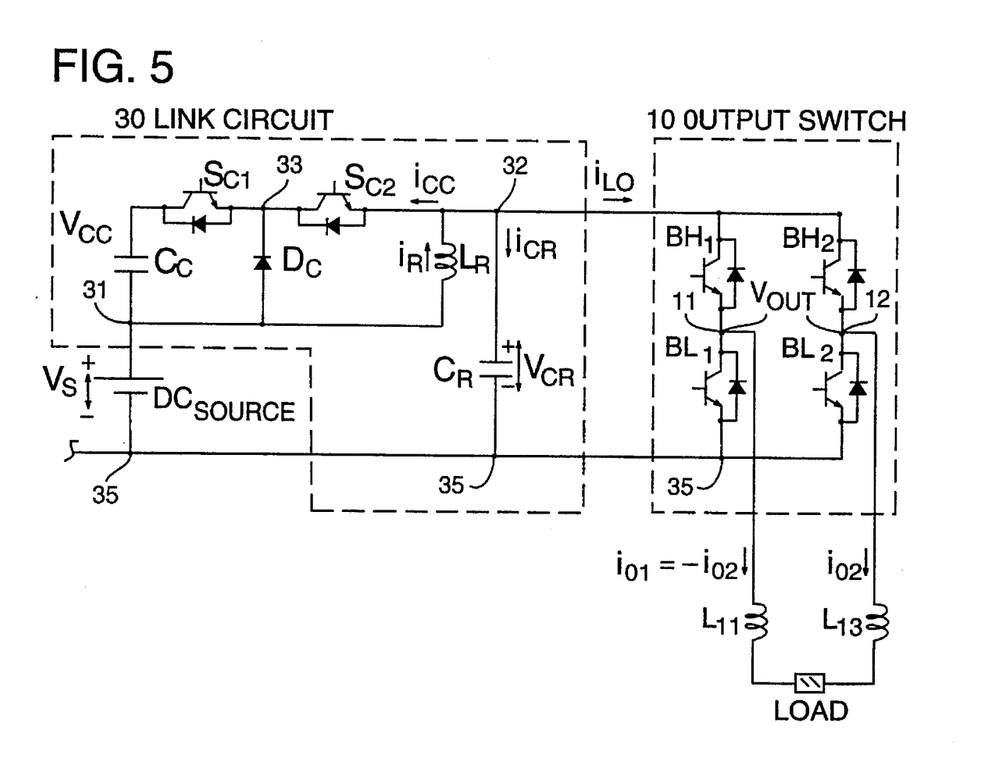
FIG. 5 is a schematic block diagram of a DC to single-phase AC power converter with a link circuit similar to that of FIG. 1.

The circuitry in FIG. 1 for the input and output switch circuits 10 and 20 consisting of respectively a diode bridge and a bridge of controllable switches, such as transistors, and diodes connected in anti-parallel to the switches, are well-known in the power converter field. The controllable switch may be any semiconductor switch which can be turned on and off by a gate signal. Examples of such a switch are well-known semiconductors such as PN junction transistors, MosFETS or IGBT's for high-power applications. The semiconductor switches have blocking capability in one direction only and a diode connected in anti-parallel to the switch is commonly included. The converter of FIG. 1 is intended for applications wherein power from a three-phase AC source needs to be converted into a three-phase AC load. A single-phase AC or DC load can be obtained simply by removing one leg of the output switch circuit 10 for instance by removing the switches BH3 and BL3, as shown in FIG. 5. Moreover, a DC to AC converter is simply obtained by removing the input switch circuit 20 and replacing the buffer capacitor $C_S$ by the DC power source as shown in FIG. 5. The diode bridge used for the input switch circuit 20 in FIG. 1 can be replaced by a bridge consisting of controllable transistor switches and anti-parallel diodes as shown in FIG. 4 which leads to another form of a voltage clamped parallel resonant converter with controllable duty cycle. An additional modification in FIG. 4 is the connection of the upper terminal of this input switch circuit 20 to output 32 rather than input 31. The converter of FIG. 4 obviously provides the capability for bi-directional operation, current waveshaping as well as control of the input power factor, in addition to retention of all other features of the converter of FIG. 1 due to the use of the same link circuit 30. The other embodiments of the link circuit 30 of FIGS. 2 and 3 are also applicable to the converter of FIG. 4.

It is important to recognize that proper operation of any kind of converter producing square-wave or near square-wave voltage pulses is only assured if the load is sufficiently inductive. This is obviously to prevent excessive excursions of the load current during the zero or idle segment of the voltage pulse because in this period the load is in essence shorted by the output switch circuit. The load is said to be free-wheeling during the idle segment of the voltage pulse. An inductor filter must be added if the load is purely resistive. The inductors $L_{11}$, $L_{12}$ and $L_{13}$ shown in the converters of FIG. 1 and 4 serve this purpose. As a consequence, the output current can be expected to vary with the relatively small excursions as the converter operates from pulse to pulse if the frequency of the voltage pulses is sufficiently high.

Referring now to FIG. 1, the use of a diode bridge for the input switch circuit 20 is to transfer energy from the source to the load by means of the buffer capacitor $C_S$. It was mentioned earlier in the discussion that the capacitance of this capacitor is to be relatively large. Therefore, for expedience in analysis of the further illustrations, the converter of FIG. 1 can be simplified by replacing the entire input switch circuit 20 and the buffer capacitor $C_S$ with a constant DC voltage source. The next component in line to transfer energy from the source to the load is the link circuit 30. The link circuit could be considered to be a pulse generator which generates unipolar link voltage pulses $V_{CR}$ from the steady DC voltage across $C_S$ or the DC source which simulates the effect of the entire input switch circuit and large $C_S$. Finally the last chain in the energy transfer process is the output switch circuit 10, which is fed by the link voltage pulses generated by the link circuit 30. The switches of the output switch circuit 10 serve the purpose of distributing the link voltage pulses over the multiple output phases to loads 14, 15 and 16. Without loss of generality, clarity in understanding the link circuit 30 is enhanced if for the moment the output is simplified to be single-phase AC.

Thus, in consideration of the discussion above, the principles of this invention will be illustrated with reference to the simplified DC to AC converter circuit shown in FIG. 5. Central in this illustration is the operation of the link circuit 30 in conjunction of the switching scheme of the switches in the output switch circuit 10. Thus, the link circuit 30 in FIG. 1 is incorporated into the simplified converter circuit of FIG. 5. It is to be noted that the converter circuit of FIG. 5 clearly represents the circuitry for a DC to single-phase AC or DC converter.

Figure 6:
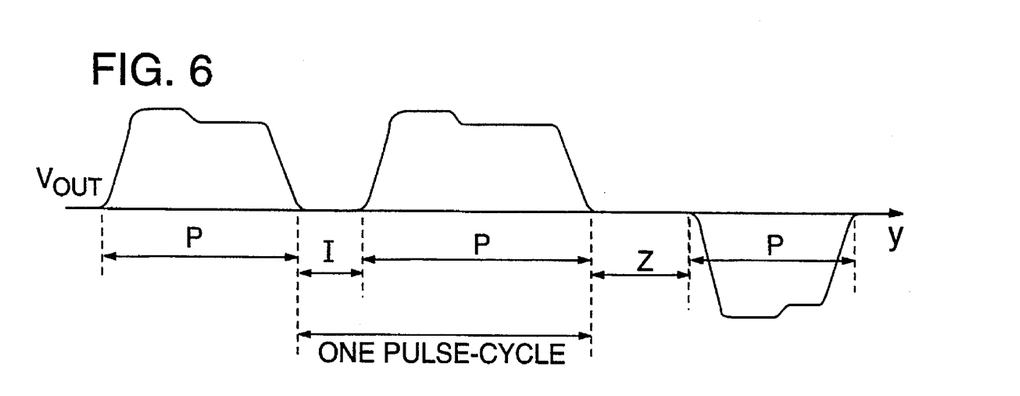
FIG. 6 shows the waveforms of the output voltage pulses which are produced in the output switch circuit in the parallel resonant converter of the present invention.

FIG. 6 shows the desired flexibility in the waveform of the converter output voltage pulses $V_{OUT}$ produced across output terminals 11, 12, which are generated by the link circuit 30 of FIG. 5 in conjunction with the switching scheme of the switches in the output switch circuit 10. While referring to FIG. 6 the introduction of certain definitions are helpful in the following description of the operation of the converter.

(a) Even though the link voltage pulses $V_{CR}$ are unipolar with the positive polarity at terminal 32, the output voltage pulses $V_{OUT}$ at terminal 11, 12 can have both positive and negative polarities. The output voltage pulse is simply positive when the switches BH1 and BL2 are turned on and negative when the switches BH2 and BL2 are turned on in FIG. 5.

(b) Each output voltage pulse consists of an idle segment, I, and a power transfer segment, P. During the idle segment the voltage is zero, while the voltage during the power transfer segment is not zero. Operation of the converter during an idle or zero segment will be referred to as the I mode and operation during a power transfer or non-zero segment as the P mode.

(c) FIG. 6 clearly reflects the objective of this invention to provide the capability for continuous control of the duration of the zero and non-zero segments in both the I and P mode. This is combined with the objective to clamp the link voltage pulses $V_{CR}$ as well as the output voltage pulses $V_{OUT}$ at terminals 11, 12 to a constant maximum predetermined voltage value which is higher than the load voltages by just a small margin, while assuring any switching to be "soft-switching" at substantially zero voltage or zero current.

(d) The duration of the zero segment of the I mode and the non-zero segment of the P mode as well as the polarity of each converter output voltage pulse $V_{OUT}$ depends on the control strategy chosen for wave-shaping the low-frequency output current or voltage. Flexibility of the pulses for this output current wave-shaping provides the possibility to apply control strategies which exploit these degrees of freedom such as pulse width modulation (PWM), or pulse area modulation (PAM) as will be used with this invention. This topic of output waveform control will be hereafter discussed. At this point, the mechanism to generate voltage pulses consisting of P modes and I modes as well as providing continuous controllability to the duration of any P mode and I mode will now be discussed.

P Mode of Operation

FIG. 7 shows the waveforms of the converter output voltage $V_{OUT}$, the link voltage pulses $V_{CR}$ and related current signals for three complete cycles of the link voltage pulses to illustrate the principle of the power transfer mode of operation, i.e. the P mode. The switching schedule of each controllable switch used in the converter of FIG. 5 is reflected at the top of FIG. 7 by arrows for the time instant of switching, T1 to T12, along with the name of the switch to be turned on or turned off. Turn off of a switch is indicated by an asterisk attached as a superscript to the name of switch. FIG. 7 also indicates the power transfer segment (P mode) and the idle segment (I mode) of each cycle with durations $P_1$, $P_2$, $P_3$ and $I_1$, $I_2$ being different for the three pulse cycles. Note that the plots in the figure also serve as an example to illustrate the degree of freedom to generate converter output voltage $V_{OUT}$ with positive and negative polarity, while as mentioned before, the link voltage pulses $V_{CR}$ are constrained to be unipolar.

The explanations for the operation during the P mode will be focussed on the $P_2$ mode of the middle pulse. The status of all switches just prior to initiating the $P_2$ mode of this pulse at T5 can be observed from FIG. 7 to be as follows: the link assembly switches $S_{C1}$ and $S_{C2}$ are off as a result of being switched off at T2 and T3, and all switches of the output switch circuit 10 are on, i.e. the switches BH1, BH2, BL1 and BL2 as a result of being switched on at T4. Thus, both the load and the link circuit 30 are shorted which is the reason why both the link voltage $V_{CR}$ and the converter output voltage $V_{OUT}$ are both zero from T4 to T5 prior to initiating the P mode. In the following discussion, the P mode will be explained.

The first action in initiating the P mode is to leave the switches BH1 and BL2 on and to turn off the switches BH2 and BL1 at time T5 to obtain the desired positive polarity of the output voltage pulse $V_{OUT}$. At this instant and throughout the remainder of the P mode, the link voltage $V_{CR}$ is equal to the output voltage $V_{OUT}$. Moreover, at time T5 the converter is triggered into the first resonance mode R1 which involves the resonant circuit formed by $L_R$ and $C_R$, subject to excitation by the voltage source $V_S$ and the link output current $i_{LO}$. In this resonance mode R1, during time T5 to T6 as well as the other resonance modes to be encountered during the P mode, the resonant capacitor voltage $V_{CR}$ and the resonant inductor current $i_R$ in the converter of FIG. 5 are governed by the following equations (neglecting resistive losses):

$$V_S = L_R \frac{di_R}{dt} + v_{CR}$$

$$i_{LO} = i_R + i_{CR}, \text{ with: } i_{CR} = C_R \frac{dv_{CR}}{dt},$$

It should be noted that prior to time T5 the link switch $S_{C2}$ is off so that the clamping current $i_{CC}$ is zero. An initial status important to the R1 mode is the value of the current $i_R$ flowing in the resonant inductor $L_R$. For the P mode of consideration during the period P2 (the middle pulse), FIG. 7 shows that the switches BH1 and BL1 are used in connection with the process of controlling the output current or voltage. As the P mode is initiated switches BH1 and BL2 are turned on and switches BH2 and BL1 are turned off, the link output current $i_{LO}$ will be equal to the load output current $i_{lo}$. Since the output currents flow through relatively large inductors $L_{l1}$ and $L_{l2}$, the link output current $i_{LO}$ being equal to the load output current $i_{lo}$, can be likewise considered constant during the time window of the P mode. In order for the link voltage $V_{CR}$ to rise from its zero value when the P mode is initiated, it is necessary for the inductor current $i_R$ during the time period T5 to T6 to have a value such that the resonant capacitor current $i_{CR}=i_R-i_{LO}$ is positive. Moreover, it can be experimentally verified and easily derived from the governing equations given above that in order for the link voltage $V_{CR}$ to reach a maximum value equal to $V_S+V_C$ during the R1 mode, it is sufficient for the resonant inductor current $i_R$ to have reached at the initiation of the P mode a value given by:

$$i_R = i_{LO} + (V_S + V_C)/Z_R, \text{ with } Z_R = SQRT(L_R/C_R)$$

wherein $Z_R$ is the characteristic impedance for the resonance circuit formed by $L_R$ and $C_R$. As will be clear during the course of the further discussion pertaining the other modes of operation associated with the P mode, it is desirable for the resonant inductor current $i_R$ to have established a value given by this relationship in order to maintain the voltage level of the clamp capacitor $C_C$ while assuring that the link voltage pulse $V_{CR}$ is able to return to zero upon termination of the P mode at T11. Subject to the resonance mode R1 and the initial condition of the resonant inductor current $i_R$ as given above, the link voltage $V_{CR}$ would gradually rise from its zero value. The resonant capacitor current $i_{CR}$ indeed flows in positive direction as shown in FIG. 7. This gradual rise of the voltage is the reason that BH2 and BL1 can be turned off at substantially zero voltage at T5.

As the link voltage $V_{CR}$ reaches the voltage level equal to $V_S+V_C$ during the R1 mode, the clamp mode C1 is entered at time T6. The resonant capacitor current $i_{CR}$ becomes practically zero, and instead, the current due to the difference in the currents $i_R$ and $i_{LO}$ will now commence to flow through the anti-parallel diodes of the switches $S_{C1}$ and $S_{C2}$. Thus, at this instant, T6, the clamping current $i_{CC}=i_R-i_{LO}$ and attains a positive value as shown in FIG. 7. During both clamp modes C1 and C2, the resonant inductor $L_R$ is subjected directly to the near-constant clamp capacitor voltage $V_C$ (the clamp capacitor $C_C$ is to be chosen relatively large) and therefore, $i_R$ will decrease from time T6 to T8 according to a near-constant time rate of change given by:

$$\frac{di_R}{dt} = V_C/L_R.$$

The current $i_{CC}=i_R-i_{LO}$ practically follows the profile of $i_R$ during T6 to T8 throughout both clamp modes C1 and C2 for the reason that the diode $D_C$ is in blocking condition during both clamp modes and for reason that the link current $i_{LO}$ is practically constant during the time frame of the pulse. During the first clamp mode C1, the current $i_{CC}$ is shown in FIG. 7 to be positive and flows through the anti-parallel diodes of the switches $S_{C1}$ and $S_{C2}$. During the C2 mode, the switches $S_{C1}$ and $S_{C2}$ should be turned on to permit $i_{CC}=i_R-i_{LO}$ to become negative in order to allow the resonant inductor current $i_R$ to decrease even further. In order to facilitate switching of $S_{C1}$ and $S_{C2}$ at substantially zero voltage, turn on of these switches should be conducted while their anti-parallel diodes are still conducting during the C1 mode. From the plot of the current $i_{CC}$ during the clamp modes C1 and C2, it is obvious that the clamp capacitor $C_C$ is charged during the C1 mode and discharged during the C2 mode. It was mentioned earlier that the capacitance of the clamp capacitor $C_C$ is to be chosen sufficiently high in order to avoid a large excursion of the clamp capacitor voltage $V_C$ during this charging and discharging process. This indeed is the basic reason why the link voltage pulse $V_{CR}$ as well as the output voltage pulse $V_{OUT}$ will not exceed a near-constant maximum voltage of a value given by $V_S+V_C$.

The C2 mode can be terminated upon turn off of the switch $S_{C1}$ at time T8. This instant should be determined on the basis of the following consideration. In order to facilitate zero-voltage switching of the output circuit switches upon entering the I mode, it is necessary for the link voltage $V_{CR}$ to return to zero prior to the instant of transition from the P mode to the I mode. A decay of this voltage $V_{CR}$ requires the resonant capacitor current $i_{CR}$ to become negative. This is only possible if during the C2 mode the inductor current $i_R$ is allowed to decrease to the point that the current $i_{CC}=i_R-i_{LO}$ becomes negative. Now, as the switches $S_{C1}$ and $S_{C2}$ are simultaneously turned off, the converter is again in a state of resonance R2 by virtue of the same resonance circuit which was active during the R1 mode. As the C2 mode is terminated by turning off the switch $S_{C2}$, the current $i_{CC}$ is forced to zero and as a result, the current $i_R-i_{LO}$ must flow through the resonant capacitor by virtue of Kirchoff's current law. Thus, at this instant, during time T8 to T9 the resonant capacitor current becomes $i_{CR}=i_R-i_{LO}$ and attains a negative value. Thus, the resonant capacitor current flows in the negative direction as is required to achieve a decay of the link voltage $V_{CR}$. Moreover, for the link voltage $V_{CR}$ to be able to return to zero from its original value of $V_S+V_C$, prior to turning off the switches $S_{C1}$ and $S_{C2}$ the resonant inductor current $i_R$ should be allowed to decrease during the C2 mode such that this current satisfies the condition:

$$i_R<i_{LO}-(V_S+V_C)/Z_R, \text{ with } Z_R=SQRT(L_R/C_R)$$

This relationship is the reason for the desirability to establish at the initiation of the P mode a value for the resonant inductor current $i_R$ as given earlier during the discussion of the initial status of the P mode. Such an initial condition for the resonant inductor current $i_R$ would lead to a theoretically zero net charge during the charging (C1 mode) and discharging (C2 mode) process of the clamp capacitor $C_C$ and therefore, avoids reduction of the voltage of this clamp capacitor. It can be demonstrated that this requirement for the resonant inductor current $i_R$ is to be met whether or not the switches $S_{C1}$ and $S_{C2}$ are turned off simultaneously. This fact is exploited to achieve the feature of controllability of the duration of the P mode.

Leaving the switch $S_{C2}$ on and turning off the switch $S_{C1}$ after allowing the resonant inductor current $i_R$ to decrease in accordance to the relationship given above, the clamp mode C2 is terminated and a rather short resonance mode R2 is initiated during T8 to T9. The same resonance circuit as during the R1 mode is activated, but with different initial conditions of the resonant capacitor voltage $V_{CR}$ and the resonant inductor current $i_R$ as shown in FIG. 7. In this mode, $i_{CR}$ takes over the negative current $i_R-i_{LO}$ for as long as the clamp diode $D_C$ is blocking. Note that turn off of $S_{C1}$ at T8 is during substantial zero-voltage and zero current $i_{CC}$, because the link voltage $V_{CR}$ is clamped to the voltage $V_S+V_{CC}$ prior to opening of this switch so the voltage across the switch is substantially zero. The diode $D_C$ is in a blocking state until $V_{CR}$, subject to a negative current, decays to the level of the DC source voltage $V_S$. At this instant, T9, the second resonance mode R2 is completed, marking the beginning of the L mode as shown in FIG. 7.

Thus, during the L mode between T9 and T10 the link voltage $V_{CR}$ is clamped to $V_S$, the resonant capacitor current $i_{CR}$ is practically zero and the diode $D_C$ is conducting, carrying a practically constant negative current equal to $-i_{CC}$, i.e. the difference between the link current $i_{LO}$ and the resonant inductor current $i_R$. Since the inductor $L_R$ is shorted by the conducting diode $D_C$ and the switch $S_{CR2}$, the inductor current $i_R$ can be considered constant, relative to the practical time frame of the duration of the L mode (about 40 micro seconds if the converter is designed to have a modulation frequency of 20 kHz). Obviously, power dissipation due to the wiring and conduction losses of the diode $D_C$ and the switch $S_{C2}$ limits the ultimate duration of this L mode. However, within practical design limits, the duration of the L mode can indeed considered to be continuously controllable.

Termination of the L mode is simply by turning off the switch $S_{C2}$ at time T10, triggering the third resonance mode R3 between T10 and T11, as shown in FIG. 7. The resonance circuit is again the same circuit active during the R1 mode as well as the R2 mode. The switching occurs at substantially zero current $i_{CC}$ and zero voltage because of the clamping of the link voltage $V_{CR}$ by the DC source voltage $V_S$ throughout the L mode. The voltage across the switch $S_{C2}$ gradually builds up as $V_{CR}$ returns to zero at time T11 by virtue of the resonance phenomenon assuming that proper care has been taken in satisfying the requirement with regard to the resonant inductor current $i_R$ at the initiation of the R2 mode. As this link voltage $V_{CR}$ reaches zero, all the switches of the output switch assembly, i.e. BH1, BL1, BH2 and BL2, are turned on at time T11 marking the completion of the P mode and the beginning of the I mode.

In conclusion, during the P mode the link voltage $V_{CR}$ as well as the output voltage $V_{OUT}$ is limited by clamping to a maximum of $V_S+V_C$. Recall that the clamp capacitor $C_C$ is to be sufficiently large so that $V_S+V_C$ can be considered practically constant during an entire pulse cycle. Thus, this clamping mechanism prevents the voltage of all critical components of the converter from exceeding a voltage level given by the voltage $V_S+V_C$. The duration of the P mode is continuously controllable basically because of the controllability of the duration of the L mode simply through control of the turn off instant of switch $S_{C2}$. Switching of all controllable switches used during the P mode has been explained to occur at substantially zero voltage.

I Mode of Operation

Figure 8:
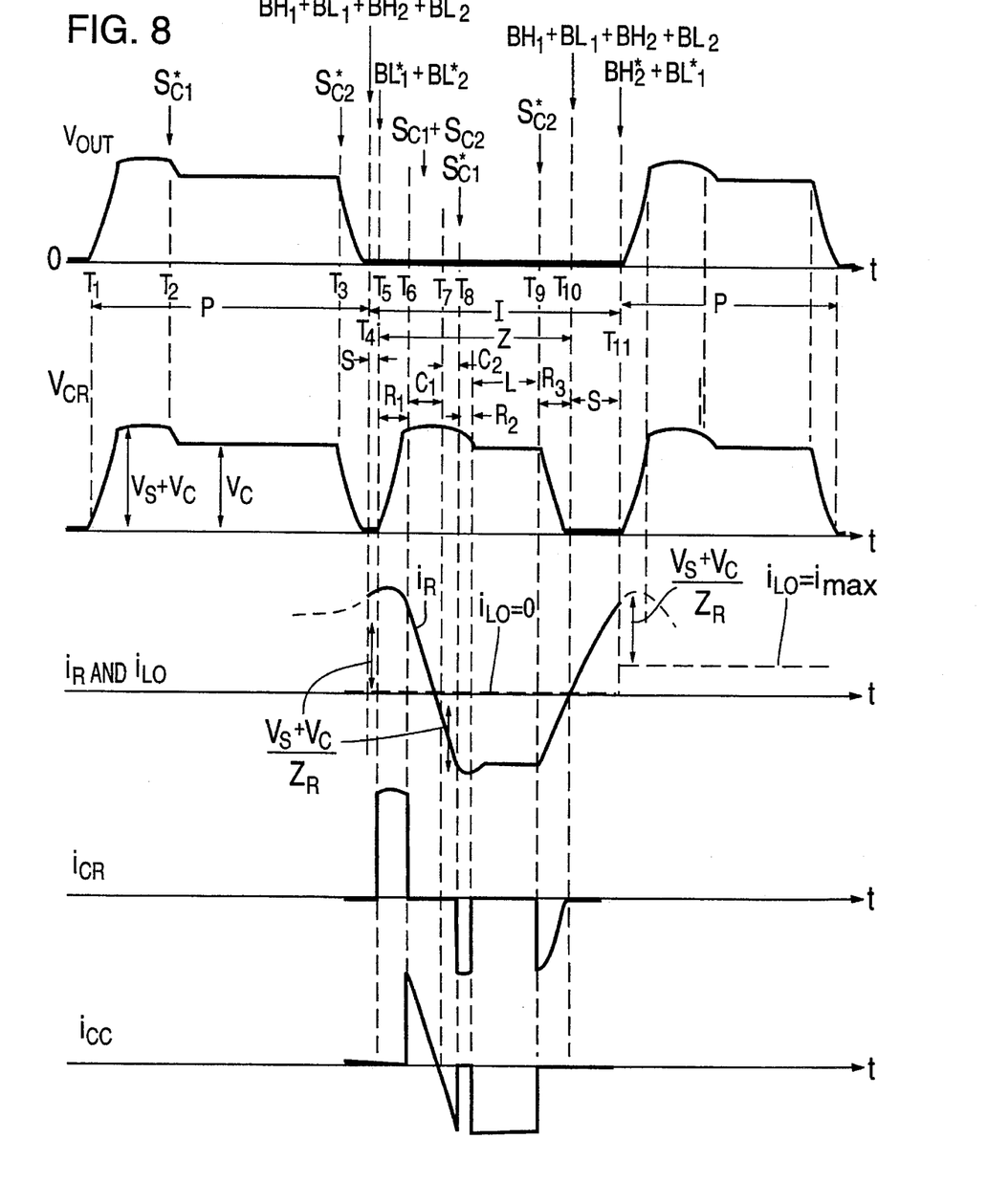
FIG. 8 shows the waveforms of signals including current signals produced during operation of the invention in the zero or idle segments of the link voltage pulses.

FIG. 8 shows the plots of pertinent variables to illustrate the principle of the I mode, i.e. idle mode of operation. The switching schedule of each controllable switch used in the converter of FIG. 5 is reflected at the top of FIG. 8 by arrows for the instant of switching at times T1 to T11, along with the name of the switch to be turned on or turned off. Turn off of a switch is indicated by an asterisk attached as a superscript to the name of the switch. The figure indicates a converter output voltage signal $V_{OUT}$ with two power transfer segments (P modes) and an idle segment (I mode) in between the two P modes. During an I mode, the output pulse voltage $V_{OUT}$ is zero. Thus, during the entire I mode no power is transferred from the source to the load or vice versa.

As shown in FIG. 8, the I mode can be considered to consist of three main modes: a zero link current (Z) mode, T5 to T10, flanked by two shorting (S) modes T4 to T5 and T10 to T11. FIG. 8 shows that the switching action for both S modes is the same. Therefore, the first S mode and Z mode could be bypassed if so desired, i.e. an I mode may be generated which consists of one single S mode. This leads to an I mode with the shortest duration. The operation of an S and Z mode in the converter of FIG. 5 is as follows:

(a) During the Z mode, the output voltage $V_{OUT}$ is zero, but the link voltage $V_{CR}$ is not zero. This is accomplished by turning on all of the upper switches of the output switch circuit 10, i.e., BH1 and BH2, and leaving turned off all of the lower switches of the switch assembly 10, i.e. BL1 and BL2. Obviously, turning on the lower switches and leaving off the upper switches of the switch circuit 10 provides the same result.

(b) During any S mode, both the output voltage $V_{OUT}$ and the link voltage $V_{CR}$ are zero. This is simply accomplished by turning on all of the switches or at least two switches forming one leg (such as BH2 and BL2), of the output switch circuit 10.

The purpose of the Z mode is to provide the converter with the capability of continuous controllability of the duration of the I mode. Control of the switches for the Z mode is equivalent to a P mode of operation as was discussed in detail earlier. The difference is only in the level of the link current $i_{LO}$ Recall that for a regular P mode, the link current $i_{LO}$ is determined by the output currents depending on the switches of the output switch circuit 10 which are selected in the process of controlling the output current or voltage. For instance, if the output voltage $V_{OUT}$ for a certain P mode is desired to be positive, then BH1 and BL2 should be turned on and BH2 and BL1 should be off as at time T11. In this case, as the P mode is initiated by this switching action, the link current $i_{LO}=i_{MAX}$. However, for a Z mode, the link current $i_{LO}$ is forced to be equal to zero due to the switching action mentioned above with the definition of the Z mode. The output voltage $V_{OUT}$ across output terminals 11 and 12 is zero because all of the upper switches BH1 and BH2 of the switch circuit 10 are turned on and the lower switches BL1 and BL2 are off. The link voltage $V_{CR}$ under the same control strategy of the switches as was outlined earlier for a regular P mode, follows the same profile as for a regular P mode as shown in the plot of the link voltage $V_{CR}$ in FIG. 8. Thus, the link voltage pulses $V_{CR}$ have positive polarity during the entire Z mode, causing the anti-parallel diodes of the lower switches of switch circuit 10 to be in blocking state throughout the Z mode. Moreover, during the clamp modes C1 and C2 the link voltage $V_{CR}$ is shown to be clamped to a near constant voltage equal to $V_S+V_C$ as well. The behavior of the resonant inductor current $i_R$, the resonant capacitor current $i_{CR}$ and the clamp current $i_{CC}$ also shows the pattern identical to those of FIG. 7 for a regular P mode, except that the link current $i_{LO}=0$ for this Z mode. In conclusion, a Z mode is equivalent to a P mode for the special case that the link current $i_{LO}$ is forced to zero. Consequently, the duration of the Z mode, like the P mode, is continuously controllable by virtue of the introduction of an L mode which can be terminated at any instant by turning off the switch $S_{C2}$ at time T9. Obviously since the duration of the Z mode is continuously controllable, the duration of the I mode is likewise continuously controllable by control of the turn off instant of the same switch $S_{C2}$.

The purpose of the first S mode from T4 to T5, is to achieve the proper initial condition for the resonant inductor current $i_R$ prior to initiating the Z mode. As explained during the discussion of the P mode, it is desirable for this inductor current $i_R$ to establish at the initiation of the P mode a value given by:

$$i_R = i_{LO} + (V_S+V_C)/Z_R, \text{ with } Z_R = SQRT(L_R/C_R)$$

This initial condition assures that the link voltage $V_{CR}$ returns to zero from T3 to T4 as the P mode is being terminated without the need to reduce the voltage level of the clamp capacitor $C_C$. This requirement is obviously also applicable to the Z mode, with the stipulation that the link current $i_{LO}$ is to be taken equal to zero. This requirement of achieving a certain value of the resonant current $i_R$ could clearly be accomplished in the S mode. During the S mode, all of the switches of the output switch circuit 10 are turned on. Therefore, during the S mode, the inductor current $i_R$ is driven up by the DC source voltage with a time rate of change given by $$\frac{di_R}{dt} = V_S/L_R.$$

Switching on the switches of the output switch circuit 10 to initiate the first S mode from a preceding P mode is at substantially zero voltage simply because the link voltage $V_{CR}$ as well as the output voltages $V_{OUT}$ are returned to zero at completion of the preceding P mode as was illustrated earlier during the discussion regarding the P mode.

The second S mode during time T10 to T11 fulfills the same purpose and triggers the same mechanism as those of the first S mode. Thus, the second S mode in essence prepares the resonant inductor current $i_R$ to attain the proper initial condition for the subsequent P mode. This initial condition depends on the value of the link current $i_{LO}$ to be dealt with for this subsequent P mode. As mentioned before, the link current $i_{LO}$ is determined by the switches of the output switch circuit 10 which are selected in the process of controlling the output current or voltage waveforms.

Link Voltage Regulation

As the rating of practically all electrical circuit components of the converter is determined by the peak value of the link voltage $V_{CR}$, it is highly desirable to regulate the link voltage $V_{CR}$ to be within a small voltage range around some nominal value. For proper design of the converter, this nominal value is to be at least equal to the peak voltage of the load which the converter is designed for, divided by the duty cycle of the link voltage pulses as the converter is operated at full-load. From the illustrations of the converter operation during the P mode as well as the I mode, it is clear that the peak value of the link voltage pulses $V_{CR}$ is limited by the sum of the DC source voltage $V_S$ and the clamp capacitor voltage $V_C$. Therefore, many approaches for regulating the peak value of the link voltage $V_{CR}$ are applicable. One such approach regulates $V_{CR}$ by maintaining the voltage $V_C$ within some voltage range through control of the net charge of the clamp capacitor $C_C$ as it is subjected to a charging and discharging process during each voltage pulse cycle. For the link circuit 30 and pulse generation control as illustrated in this invention with reference to the converter of FIG. 5, this charging and discharging process occurs in the C1 and C2 modes respectively. Operation in both these C1 and C2 modes during the P mode and I mode were discussed respectively with reference to FIGS. 7 and 8. Zero voltage soft-switching requires the link voltage $V_{CR}$ to be able to return to zero before all of the switches of the output switch circuit 10 of FIG. 5 are turned on at time T4 to terminate the P mode and to continue with the I mode. It was mentioned earlier that for this purpose the resonant inductor current $i_R$ should be allowed to decrease during the C2 mode such that this current satisfies the condition $i_R = i_{LO} - (V_S + V_C)/Z_R$. Control of $i_R$ in this fashion is achieved by controlling the instant of turn off of the switch $S_{C1}$ at T8, as can clearly be observed from the plots in both FIGS. 7 and 8. Moreover, these figures also reveal that requiring the net charge of the clamp capacitor $C_C$ to be zero for each pulse, leads to the following characteristic behavior of $i_R$ during the C1 and C2 modes: the resonant current $i_R$ swings positive and negative around the link output current $i_{LO}$ such that the difference current $i_R - i_{LO}$ at the initiation of the C1 mode and termination of the C2 mode are equal in value but opposite in sign. Therefore, the net charge of $C_C$, as it is charged during the C1 mode and discharged during the C2 mode, can clearly be controlled to be greater or less than zero by controlling the resonant inductor current $i_R$ to be greater or smaller than $(V_S + V_C)/Z_R$ as the C1 mode is initiated. Control of $i_R$ for this purpose is achieved by controlling the instant of switching off the output switches BH2, BL1 of switch circuit 10 at T5, marking the initiation of the P mode as indicated in FIG. 7.

Output Waveform Control

Like any kind of parallel resonant converter, the converters under consideration shown in FIGS. 1, 4 and 5, generate a train of link voltage pulses $V_{CR}$. Therefore, the inner control of this converter is essentially a current control scheme, i.e. an increase or decrease of the output current is accomplished by routing the link voltage pulse $V_{CR}$ to produce an output voltage that is positive or negative at the output terminals 11, 12 and 13. The principles of controlling the output waveforms will be illustrated with reference to the control block diagram of FIG. 10 wherein the control strategy is reflected to control the output currents to follow some current reference signals produced by current source 410. Voltage control for this converter is simply achieved by switch 415 switching from the current reference signal source 410 to the output of an output voltage feedback loop controller 430. This controller 430 is fed by the difference signal of some voltage reference signal from voltage source 420 and a sensor signal from sensor 425 representing the filtered or non-filtered actual output voltage. The difference signal may be subjected in the controller 430 to just a single amplification process or to a processing scheme which makes use of a combination of PID (proportional, integrational or derivative) control elements well-known to those skilled in the art for the purpose of enhancing the controller's response if necessary.

The ultimate assignment of the output waveform controller 430 is to provide the gate signals to the drivers of the controllable semiconductor of switches used in the circuit. The control switch gate logic circuit 490 which forms these gate signals is basically provided with two pieces of information fed from two components:

(1) the link voltage pulse modulator 480 which determines the timing for turn on and turn off of all switches, and (2) the link voltage pulse router 450 which selects the switches of the output switch circuit 10 (with reference to FIGS. 1, 4 or 5) that are to be switched to transfer power to the load. Each of these components will be treated in more detail during the course of the further discussion.

The link voltage pulse modulator 480 incorporates the pulse modulation process chosen. This choice depends on many aspects such as the field of use or the kind of load encountered, compatibility with commercially available control elements, and the cost allocated to the controller as part of the total cost of the converter as a product. It was mentioned before that this invention facilitates controllability of the durations of both the I (idle) mode and the P (power transfer) mode as segments of each voltage pulse. Therefore, any control strategy which exploits these degrees of freedom, such as the well-known pulse width modulation (PWM) control, could be applied. The modulation process which is preferred and will be illustrated is pulse area modulation (PAM) wherein the pulse width is subject to a modulation process, but not due to a strategy based on sampling a uniform carrier signal as is used in a conventional pulse width modulation control. Controllability of the duration of the I mode is exploited by modulating the initiation of the pulse, i.e. the initiation of the P mode. The pulse area criterion is applied in the sense that the area under the output voltage reference (as a function of time) and the area under the actual output voltage (as a function of time) ought to be equal before the next P mode of the pulse is initiated. Rather than measuring the associated voltage signals and integrating the profile of these signals with respect to time, information regarding the output voltage area can be conveniently obtained from the output current. As a result, a simple and robust feedback control system is obtained by detecting the output current errors $E_i$ defined as:

$$E_i = i_i^{REF} - i_i,$$

with $i_i$ denoting the output line currents and $i_i^{REF}$ the reference signals for these line currents. The simple process is executed in the output current error detector 440 whose inputs are connected to switch 415 and to a sensor 445 for sensing the converter output currents, $io_1$, $io_2$ and $io_3$. The output signals of this detector 440 are fed to the link voltage pulse modulator 480 which controls the pulse modulation process in two steps. Step (1): Issuing an initiation command for a next P mode as the error signals have grown beyond a certain desired margin with respect to the current reference. Obviously the flexibility of controlling the duration of the I mode is made use of. Step (2): Issuing a command to terminate the P mode and commence with the I mode as the error signals have reduced to be within a certain design margin. Here the flexibility of controlling the duration of the P mode is exploited.

Figure 11:
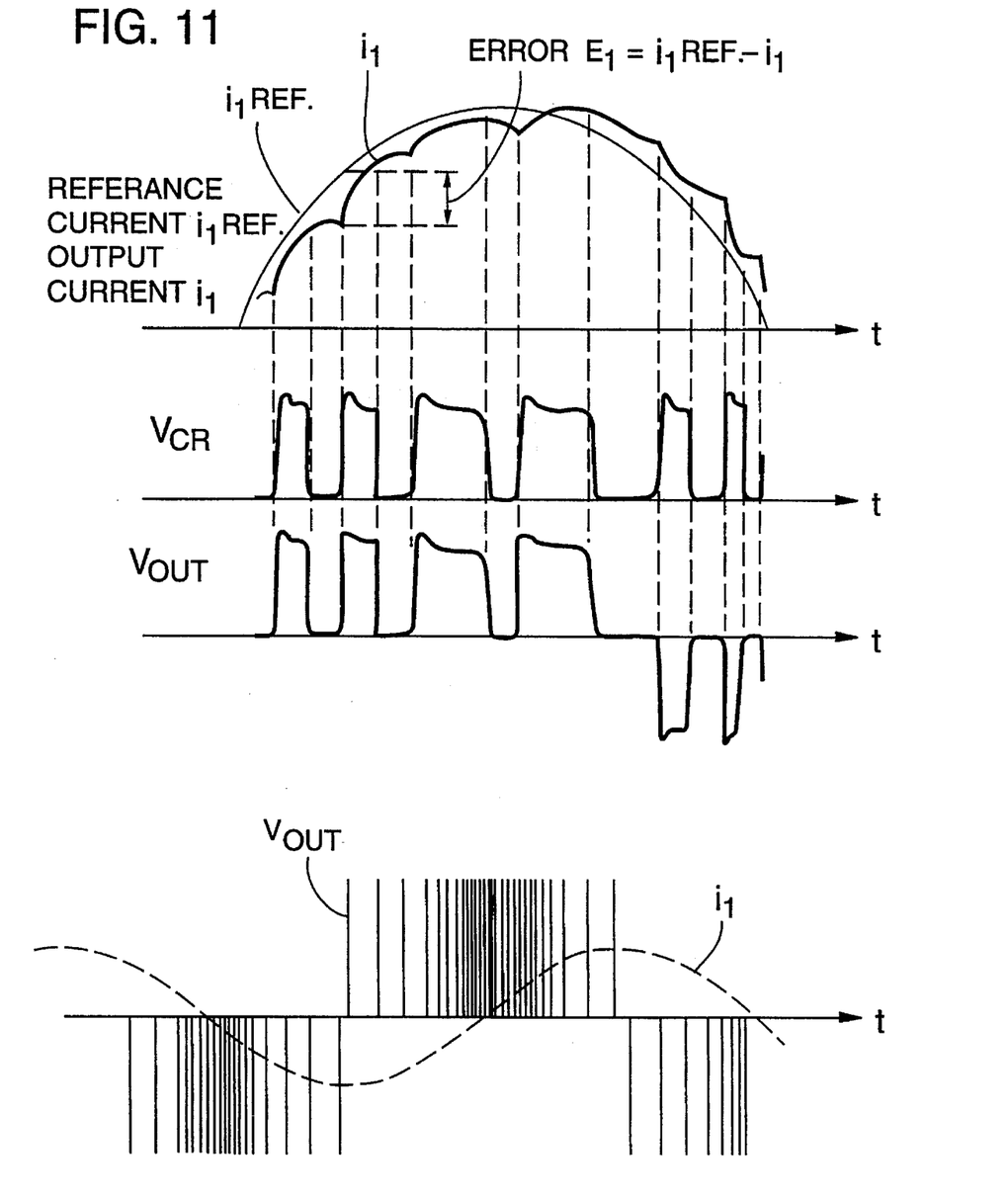
FIG. 11 shows waveforms of signals controlled by the control system of FIG. 10.

It is remarked that a modulation control with a fixed duration of the P mode in Step (2) while leaving the duration of the I mode in Step (1) variable, i.e. made to depend on the status of the error signals, is also quite feasible. Leaving the duration of the I mode variable is extremely beneficial to maintaining a high converter efficiency during operation at less than full-load. FIG. 11 illustrates the result of applying the described modulation process on any of the converters shown in FIGS. 1, 4 or 5. The behavior of the sensor current $i_i$ as one of the output line currents in relation to its reference signal $i_i^{REF}$ is shown in the first upper waveform plot of FIG. 11.

Figure 10:
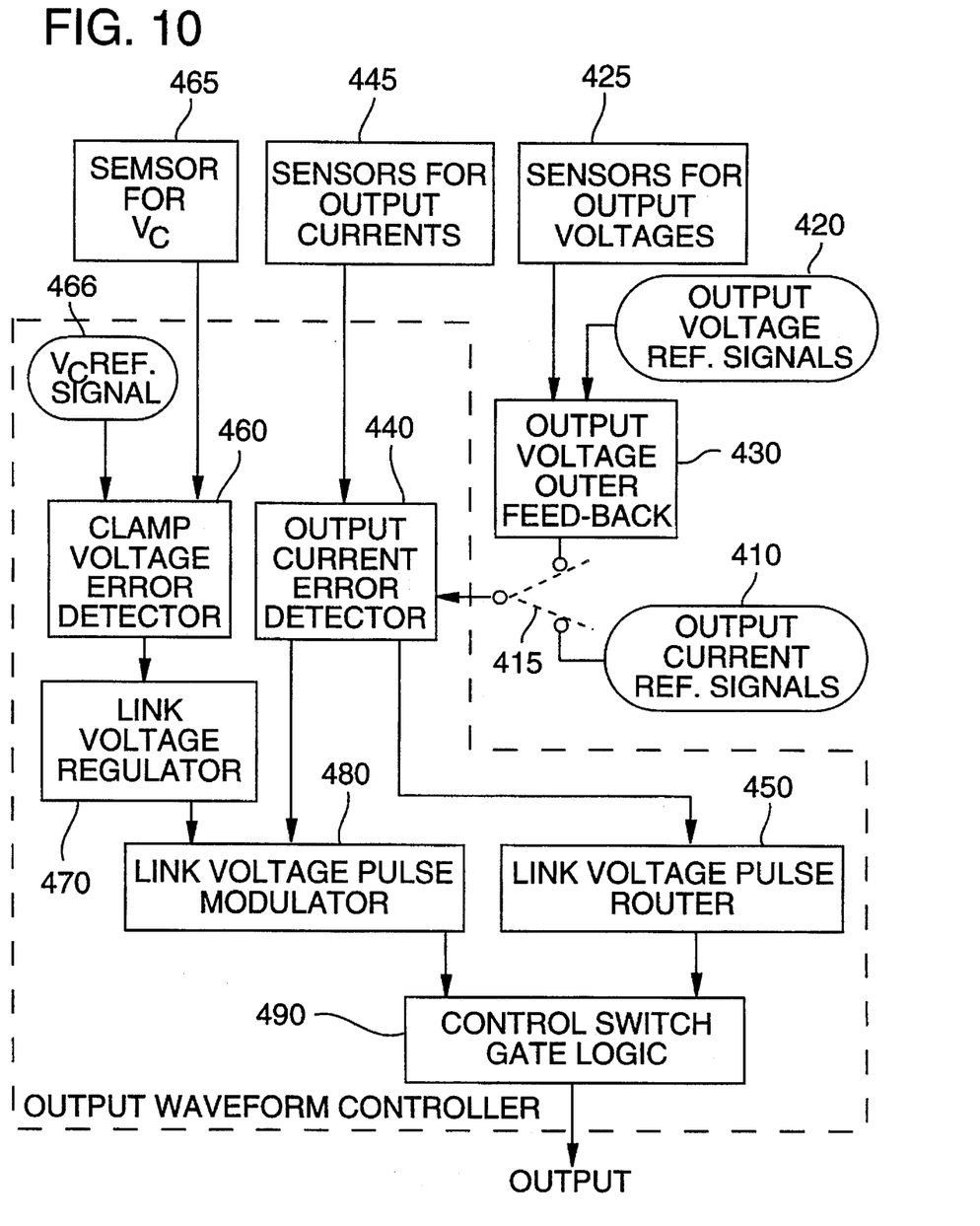
FIG. 10 is a block diagram showing a control system used with the resonant converter of the invention for controlling the signal waveforms.

The control block diagram in FIG. 10 shows that the link voltage pulse modulator 480 is also provided with information from a link voltage regulator 470. The capability of the converter to control the peak value of $V_{CR}$ by means of controlling the voltage $V_C$ across the clamp capacitor $C_C$ was discussed above regarding the I mode operation. It was explained that the desired controllability is achieved by controlling the duration of the S mode (part of I mode) which occurs prior to a subsequent p mode. FIG. 10 shows that the link voltage regulator 470 is connected to the output of a clamp voltage error detector 460 which produces an error or deviation signal representing the deviation of the sensed voltage $V_C$ across the clamp capacitor produced by sensor 465 and a reference value $V_C^{REF}$ from a reference signal source 466. The regulator 470 provides the information to the link voltage pulse modulator 480 on whether the mentioned S mode needs to be prolonged or shortened in order to maintain the peak value of the link voltage pulses $V_{CR}$ within a certain voltage range around some nominal value. If the deviation signal $V_C^{REF} - V_C$ is beyond a certain margin and positive, then the mentioned S mode needs to be prolonged. If the deviation signal is beyond the voltage range and negative, then the mentioned S mode needs to be shortened.

FIG. 11 also indicates that the unipolar link voltage pulses $V_{CR}$ need to be switched or routed such that the output voltage pulses $V_{OUT}$ achieves the proper polarity to cause the output current $i_i$ to either increase or decrease as desired, i.e. the deviation of the output current $i_i$ with respect to the reference signal $i_i^{REF}$ should decrease. This is accomplished by the link voltage pulse router 450 of FIG. 10 which, as mentioned earlier, is the second component providing critical information to the control switch gate logic 490. Thus, important to the decision process to be made by the link voltage pulse router 450 is the information regarding the sign of the error signals $e_k = i_k^{REF} - i_k$ of all line currents k. These signals can be obtained from the output current error detector 440 which was already needed for the link voltage pulse modulator 480. Consider for example, with reference to FIG. 11, the status of the output current error $E_1 = i_i^{REF} - i_1$ prior to the second output voltage pulse $V_{OUT}$. The sign of this error signal $E_1$ can be observed from the first waveform plot of FIG. 11 to be positive. Now, with reference to the converter of FIG. 5, the output current error $E_2 = i_2^{REF} - i_2$ will be opposite in sign to $E_1$ because the single phase output obviously causes the output current $i_1$ to be equal and opposite in sign to the output current $i_2$. Because $E_1$ is positive and $E_2$ is negative, obviously a reduction in these current errors occurs if the link voltage pulse $V_{CR}$ is routed to cause the output voltage $V_{OUT}$ to be positive. This can be achieved by selecting the switches BH1 and BL2 for power transfer during this second pulse. Therefore, the logic to be incorporated by the link voltage pulse router for a converter with a three-phase output is simply:

If $E_k > 0$ (for k=1, 2 or 3), select BHk of the output switch circuit 10 for power transfer: turn on BHk and turn off BLk. FIG. 11 shows the $V_{OUT}$ pulses as a result of the routing of the link voltage pulses $V_{CR}$ in accordance with this logic. In the third plot the $V_{OUT}$ voltage pulses are illustrated in magnificent time form for some six pulses. In the fourth plot the result for a more realistic time scale modulation frequency for the $V_{OUT}$ voltage pulses is demonstrated. Another task to be incorporated by the link voltage pulse router 450 is the creation of a Z mode if the link voltage pulse modulator 480 requests the duration of the I mode to be extended beyond the duration as determined by a single S mode. As explained earlier during the discussion of the I mode, the assignment is accomplished simply by turning on all of the upper switches and turning off all lower switches of the output switch circuit Embodiments of FIGS. 2 and 3

The foregoing has outlined several different embodiments of the present invention. In particular, the principles of operation have been illustrated on the basis of the preferred embodiments of FIGS. 1 and 5. However, to those skilled in the art it is clear that a full understanding of the principles of this invention could also lead to realizing the objects of this invention by other embodiments or in a different manner, even though other additional features or characteristics may result from the use of these other embodiments as hereafter discussed.

FIG. 2 represents another embodiment of the converter of the present invention using a second type of link circuit 30' wherein, as opposed to the link circuit 30 of FIG. 1, the emitters of the link switches $S_{C1}$ and $S_{C2}$ are connected to each other, but with the series connection of switch $S_{C2}$ and the diode $D_C$ still connected in parallel to the resonant inductor $L_R$. The switch $S_{C2}$ carries the same basic function as in the preferred embodiment, i.e. control of the turn off instant of this switch accomplishes continuous controllability of the duration of the P mode as well as that of the I mode. As a matter of fact, the illustrations of the operation in both the P and I mode, including the associated switch firing control as has been covered with reference to FIGS. 7 and 8, are completely applicable to the embodiment of FIG. 2.

Figure 9:
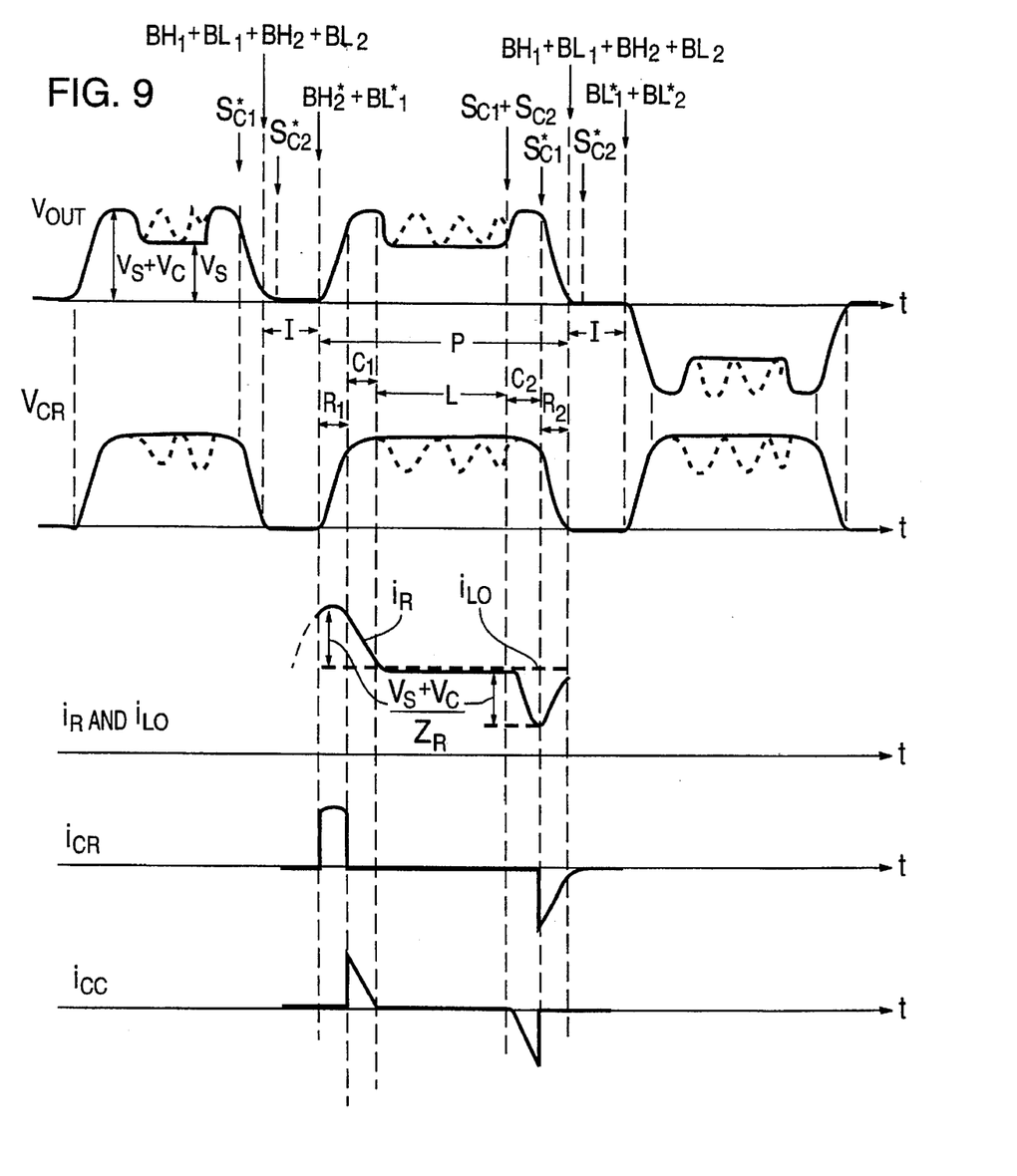
FIG. 9 shows the waveforms of signals including current signals produced by the link circuit shown in FIG. 3 during the operation in the non-zero or power transfer segment of the link voltage pulses.

FIG. 3 is yet another embodiment of this invention with a third type of link circuit 30". The link circuit 30" of FIG. 3 differs from that of FIG. 1 by connecting the second link switch $S_{C2}$ in series with the resonant capacitor $C_R$ and eliminating the clamping diode $D_C$. FIG. 9 shows the firing schedule of the control switches $S_{C1}$ and $S_{C2}$ in the link circuit of FIG. 3 to generate the desired link voltage pulses $V_{CR}$ with the turn on and turn off instants of the switches indicated with arrows like in FIGS. 7 and 8. FIG. 9 also includes the associated behavior of the output voltage pulse $V_{OUT}$, the link voltage pulse $V_{CR}$ as well as the currents flowing in the link assembly 30, i.e. the resonant inductor current $i_R$, the resonant capacitor current $i_{CR}$, the link output current $i_{LO}$ and the clamp switch current $i_{CC}$. There are minor differences in comparing the plots of FIG. 9 which reflect the behavior of the link assembly 30" of FIG. 3 with the plots of FIG. 7 which reflect the behavior of the link circuit 30 in FIGS. 1 and 5. However, the main features of the converter which provide the overall objective of the present invention are completely preserved. During the P mode the link voltage pulse $V_{CR}$ as well as the output voltage pulse $V_{OUT}$ are limited to a maximum voltage of $V_S + V_C$. The clamp capacitor $C_C$ could again be chosen sufficiently large so that $V_S + V_C$ is practically constant during an entire pulse cycle. Thus, this clamping mechanism prevents the voltage of all critical components of the converter from exceeding a maximum voltage level given by the voltage $V_S+V_C$. The duration of the P mode is continuously controllable by switching the link switches $S_{C1}$ and $S_{C2}$ and the output switches BH1, BH2, BL1 and BL2 in switch circuit 10, on the basis of the same principle used for the preferred embodiments of FIGS. 1 and 5. Thus, an L mode is again present and controllability of its duration simply through control of the turn on instant of switches $S_{C1}$ and $S_{C2}$, provides controllability of the duration of the P mode. Moreover, using the same Z mode as a strategy for controlling the duration of the I mode by changing the turn off times of the output circuit switches BH1 and BL2, the duration of the I mode for this embodiment is likewise controllable. Moreover, it can be concluded from the plots shown in FIG. 9 that switching of all controllable switches occur at substantially zero voltage, except when turning on the switches $S_{C1}$ and $S_{C2}$. However, the plots in FIG. 9 for the currents through these switches clearly demonstrates that these switches are turned on at substantially zero current since $i_{CC}$ is zero and because of the resonant inductor $L_R$ which slows down the decay of the resonant inductor current $i_R$ as $S_{C1}$ is turned on. As a final remark, during the L mode the voltage pulses $V_{OUT}$ and $V_{CR}$ are subject to oscillations as indicated with dashed lines on the associated plots in FIG. 9. These oscillations are due to the parasitic capacitance of the switch $S_{C2}$ and its anti-parallel diode which are both in blocking state during the L mode. However, these oscillations are clamped in a narrow range between the voltage $V_S+V_C$ and $V_S$ and as such are not detrimental to the voltage nor current rating of the converter elements.

Extending the principles of this invention as it was illustrated with reference to FIGS. 5 and 1 to the converter shown in FIG. 4, is apparent. Compared to the converter of FIG. 1, the converter in FIG. 4 is capable of bi-directional and four-quadrant operation due to the addition of controllable switches each including a transistor and anti-parallel diode, to the input switch circuit 20. Also the upper terminal of the input switch circuit 20 is directly connected to the upper output terminal 32 of the link circuit 30. Thus the principles of this invention described above with respect to FIGS. 1 and 5 also apply to the converter in FIG. 4 since this converter is equivalent to the converter of FIG. 5 which is connected to two sets of three-phase systems in parallel. These two sets of parallel three-phase systems are joined to the link circuit 30 at outputs 32 and 35. The link output current for the converter of FIG. 5 is the current denoted by $i_{LO}$. For the converter of FIG. 4, this link output current is given by $i_L = i_{LO} - i_{LI}$. The DC voltage source of FIG. 5 should now be perceived to be the voltage across the buffer capacitor $C_S$ in FIG. 4. Control of the voltage across this buffer capacitor as well as providing controllability to the input line currents as part of the power transfer control strategy can be applied in accordance with the same principles as applied in controlling the output waveforms for the simplified converter in FIG. 5. Thus, no conceptional changes and only minor extensions to the implementation is needed to control the input as well as output waveforms. This extension is possible to be in accordance with principles well-known to those skilled in the art and described in various patents and publications, such as textbook by N. Mohan, T. M. Undeland and W. P. Robbins, "Power Electronics: Converters, Applications and Design", (John Wiley and Sons, 1989), pp. 415–427.

It will be obvious to those having ordinary skill in the art, that many changes may be made in the above-described embodiments of the invention without departing from the objects of the invention. Therefore, the scope of the invention is to be determined from the following claims.

We claim:

1. A parallel resonant converter for transferring electrical power between a power source and a load, comprising:

a first switch circuit for coupling the source to the load;

a link circuit for generating link signal pulses connected between the source and the first switch circuit, said link circuit containing a parallel resonant tank circuit with a resonant capacitor connected in parallel to the first switch circuit; and the link circuit containing link switches which are electronically switched to generate a train of link voltage pulses that are transmitted to the output terminals of the first switch circuit with each voltage pulse consisting of a zero and non-zero segment and both segments being continuously and independently controllable in duration by said link switches.

2. A parallel resonant converter according to claim 1 wherein resonant oscillation due to said resonant tank is active only during the transitions between zero and non-zero voltage levels of the link voltage pulses.

3. A parallel resonant converter according to claim 1 which also includes a control device for switching all the link switches by control signals at substantially zero voltage or zero current of the link signal.

4. A parallel resonant converter according to claim 1 wherein a second switch circuit is connected between the power source and the link circuit.

5. A parallel resonant converter according to claim 4 which also includes a control device for switching all switches by control signals at substantially zero voltage or zero current.

6. A parallel resonant converter according to claim 1 wherein the link voltage is clamped by a voltage clamp device to a predetermined maximum voltage during the non-zero segment of each link voltage pulse.

7. A parallel resonant converter in accordance with claim 6 in which the voltage clamp device includes a clamp diode and a clamp capacitor connected to at least one link switch.

8. A parallel resonant converter in accordance with claim 7 in which a first link switch is connected between said clamp capacitor and said clamp diode.

9. A parallel resonant converter in accordance with claim 8 which includes a second link switch connected to the clamp diode and a resonant inductor of said tank circuit.

10. A parallel resonant converter in accordance with claim 9 in which the second link switch is connected between the clamp diode and the resonant inductor.

11. A parallel resonant converter in accordance with claim 9 in which the second link switch is connected in series with the resonant capacitor.

12. A parallel resonant converter in accordance with claim 9 in which the first and second link switches each include a transistor with an anti-parallel diode connected between its emitter and collector.

13. A method of operating a parallel resonant converter to transfer electrical power between a power source and a load, wherein the load voltage waveforms are synthesized by the converter, including the steps of:

generating link voltage pulses having zero voltage segments and non-zero voltage segments in a link circuit;

transmitting the link voltage pulses to the output terminals of a first switch circuit connected between the link circuit and the load;

controlling the duration of the zero and non-zero segments of each link voltage pulse so that the duty cycle of such pulses may be controlled continuously during the generation of said link signals; and limiting the maximum voltage of said link voltage pulses to a predetermined voltage.

14. A method according to claim 13, including the step of controlling the highest voltage level to which the link voltage is limited during the non-zero segment of the link voltage pulses to a voltage which is approximately equal to the load voltage.

15. A method according to claim 13 which also includes the steps of:

transmitting the link voltage pulses through a second switch circuit connected between the power source and the link circuit to the input terminals of said second switch connected to said source; and controlling the duration of the zero and non-zero segments of the link voltage pulses applied to said input terminals.

16. A method according to claim 13 in which the link voltage pulses are unipolar pulses.

17. A method in accordance with claim 13 in which the resonant circuit of the converter is controlled to oscillate only during the transition of the link voltage pulses between the zero segments and the non-zero segments.

18. A method in accordance with claim 13 in which the duration of the zero and non-zero segments is controlled by operating link switches with control signals.

19. A method in accordance with claim 13 in which the maximum voltage of the link voltage pulses is limited by a clamp diode and a clamp capacitor connected to at least one link switch.

20. A method in accordance with claim 19 in which a second link switch connected to the clamp diode and a resonant inductor of the resonant circuit of said converter.

* * * * *